United States Patent [19]

Kolb

[11] 3,864,299

[45] Feb. 4, 1975

[54] HIGHLY REACTIVE SELF-CROSSLINKABLE COPOLYMERS AND A PROCESS FOR THEIR PRODUCTION

[75] Inventor: Günter Kolb, Leverkusen, Germany

[73] Assignee: Bayer Aktiengesellschaft, Leverkusen, Germany

[22] Filed: Oct. 25, 1973

[21] Appl. No.: 409,407

[30] Foreign Application Priority Data
Oct. 28, 1972 Germany............................ 2253067

[52] U.S. Cl.... 260/29.7 H, 260/29.6 AN, 260/29.6 H, 260/29.6 T, 260/29.6 TA, 260/29.7 T, 260/77.5 R, 260/83.5, 260/86.1
[51] Int. Cl..... C08f 15/16, C08f 15/36, C08f 15/38
[58] Field of Search..... 260/77.5 R, 29.6 H, 29.7 H, 260/83.5, 86.1, 29.7 T, 29.7 W, 29.6 AN, 29.6 T, 29.6 TA

[56] References Cited
UNITED STATES PATENTS
3,360,504  12/1967  Kelley............................ 260/77.5 R
3,622,532  11/1971  Kolb et al. ..................... 260/77.5 R
3,627,819  12/1971  Nowak et al................... 260/77.5 R
3,671,492  6/1972   Nakaguchi et al............. 260/77.5 R FOREIGN PATENTS OR APPLICATIONS
1,195,739  7/1965  Germany
1,278,064  9/1968  Germany
1,020,142  2/1966  Great Britain Primary Examiner—Morris Liebman
Assistant Examiner—T. DeBenedictis, Sr.
Attorney, Agent, or Firm—Connolly and Hutz

[57] ABSTRACT

(Meth)acrylamidomethylene carbamic acid (meth)allyl esters and at least one other copolymerizable monomer are copolymerized by, solution, emulsion or suspension polymerization at temperatures of below about 60°C in the presence of radical-forming agents. Dispersions of the self-crosslinkable copolymers are particularly suitable for impregnating, consolidating and coating non-woven fabric, for coating metal substrates and as dressing for leather.

4 Claims, No Drawings

HIGHLY REACTIVE SELF-CROSSLINKABLE COPOLYMERS AND A PROCESS FOR THEIR PRODUCTION

This invention relates to highly reactive, self-crosslinkable copolymers of (meth)acrylamidomethylene carbamic acid(meth)allyl esters and other monomers, and to a process for their production.

German Pat. No. 1,195,739 discloses a process for the production of $\alpha,\beta$-unsaturated organic compounds which at least once contain the group $$-CO-NH-CH_2-NH-COOR$$

in which R represents an alkyl-, cycloalkyl-, aralkyl- or aryl-radical. Specific examples of radicals represented by R include methyl, ethyl and allyl. Compounds of this kind represent analeptics of unexpectedly low toxicity or can be used as plant-protection agents, stabilisers or antiagers in the plastic industry.

It is also known that compounds corresponding to the general formula:

$$CH_2=\underset{R_1}{\underset{|}{C}}-CONH-CH_2-NH-COOR_2$$

in which $R_2$ represents saturated alkyl radicals or the phenyl radical, can be used as copolymerisation components (cf. German Pat. Nos. 1278,064 and 1,444,068).

The object of the present invention was to improve the copolymers described above to the extent that, after crosslinking, they show a particularly low swelling value and a particularly high resistance to solvents, coupled with better elasticity values and greater resistance to abrasion.

According to the invention, this object is achieved by virtue of the fact that (meth)acrylamidomethylene carbamic acid(meth)allyl esters are used instead of (meth)acrylamidomethylene carbamic acid alkyl or aryl esters as crosslinking component.

Accordingly, the invention relates to a process for the production of highly reactive, self-crosslinkable copolymers of (meth)acrylamidomethylene carbamic acid esters as crosslinkers and at least one other copolymerisable monomer by, solution, emulsion or suspension copolymerisation with radical-forming substances at temperatures below about 60°C, distinguished by the fact that (meth)acrylamidomethylene carbamic acid allyl esters or (meth)acrylamidomethylene carbamic acid methallyl esters are used as crosslinking agents.

The invention also relates to the products obtained by this process.

The (meth)acrylamidomethylene carbamic acid(meth)allyl esters used in accordance with the invention can be obtained by the process described in German Pat. No. 1,195,739. They can be used for copolymerisation in quantities of from 0.5 to 30 % by weight, preferably in quantities of from 0.5 to 10 % by weight, based on the total monomers used, and can be present in the same proportions in the resulting copolymer.

The following can be used as copolymerisable monomers: $\alpha,\beta$-monoolefins having 2 to 4 carbon atoms such as ethylene, propylene, 1-butene, isobutylene, preferably propylene; conjugated diolefins having 4 to 6 carbon atoms such as butadiene, isoprene, chlorobutadiene, preferably butadiene; (meth) acrylic acid; (meth)acrylonitrile; (meth)acrylamide; (meth) acrylic acid esters having 1 to 18 and preferably 1 to 4 carbon atoms in the alcohol component such as methyl (meth)acrylate, ethyl(meth)acrylate, propyl(meth)acrylate, isopropyl (meth)acrylate, n-butyl(meth)acrylate; vinyl esters of organic mono carboxylic acids, the acid component containing 1 to 18, preferably 2 to 4, carbon atoms such as vinyl acetate and vinyl propionate; monoolefinically unsaturated halogenated hydrocarbons, preferably vinyl chloride or vinylidene chloride; aromatic vinyl compounds, such as styrene, o- or p-methylstyrene, $\alpha$-methylstyrene preferably styrene; $\alpha$-$\beta$-monoolefinically unsaturated dicarboxylic acids with 3 to 5 carbon atoms or their anhydrides, amides, semi-amides, esters with 1 to 18, preferably 1 to 4, carbon atoms in the alcohol component. Maleic acid or itaconic acid and the corresponding derivatives are preferred; heterocyclic vinyl compounds such as N-vinylpyrrolidone or 2-vinylpyridine; hydroxyalkyl esters, hydroxyalkyl amides, aminoalkyl esters, aminoalkyl amides of (meth)acrylic acid having 2 to 4 carbon atoms in the alkyl radical, preferably 2-hydroxyethylacrylate, 2-hydroxypropylmethacrylate, 2-aminoethylmethacrylate or 2-dimethylaminoethylmethacrylate.

The above monomers can be used for copolymerisation and can be incorporated in the copolymer in quantities of from 70 to 99.5 % by weight, preferably in quantities of from 90 to 99.5 % by weight, based on the total monomer content.

A copolymer of particularly favourable composition is obtained by copolymerising and incorporating into the copolymer

- 70 to 85 % by weight of acrylic acid ester with 1 to 4 carbon atoms in the alcohol component, preferably ethyl and n-butyl acrylate,
- 8 to 15 % by weight of acrylonitrile,
- 5 to 10 % by weight of acrylic acid,
- 1 to 5 % by weight of methacrylamidomethylene carbamic acid allyl ester.

Copolymerisation is carried out by the methods of, solution, emulsion or suspension polymerisation at temperatures of up to about 60°C in the presence of substances which form free radicals.

The monomer units incorporated in the copolymer are present in substantially statistical distribution.

The monomers used in accordance with the invention are preferably polymerised in aqueous emulsion, for which purpose it is possible to use conventional emulsifiers of the anionic, cationic or non-ionic type. In many cases, it is advantageous to combine anionic and non-ionic emulsifiers.

Suitable polymerisation catalysts include organic percompounds such as tert.-butylperoctoate, benzoylperoxide, tert.-butylhydroperoxide and cumenehydroperoxide, inorganic percompounds such as potassium persulphate, preferably in the form of redox systems, or azo compounds such as azo-bis-isobutyronitrile, depending upon the type of polymerisation medium.

Redox systems containing alkali metal or ammonium persulphate, hydrogen peroxide, alkali metal or ammonium perchlorates, perborates, percarbonates and perphosphates as their oxidising component, are of particular interest. Suitable reducing agents include both sulphur compounds of the low valency stages of sulphur active in acid medium, for example, alkali metal or ammonium pyrosulphites, alkali metal or ammonium bisulphites or alkali metal thiosulphates. It is also possible to use alkali metal formaldehyde sulphoxylates, formamidine sulphinic acid, p-toluene sulphinic acid and reducing agents that are only active in alkaline medium such as triethanolamine, diethylenetriamine and triethylenetetramine.

These catalysts can be used in the ususal quantities of from 0.1 to 10 % by weight, preferably 0.1 to 3 % by weight, based on total monomer. The proportion by weight of the reducing component should amount to at least 5 % of the proportion by weight of the oxidising component. It is particularly preferred to use combinations of organic hydroperoxides with alkali metal- formaldehyde sulphoxylates in quantities of from 0.1 to 2 % by weight for the copolymerisation process according to the invention.

Molecular weight can be regulated by substances known per se, for example long-chained mercaptans, such as tert.-dodecyl mercaptan. They are best used in quantities of from 0.02 to 5 % by weight and preferably in quantities of from 0.5 to 3 % by weight, based on the weight of the total monomers.

The molecular weights of the copolymers, as determined by osmometry, are between 10,000 and 250,000, depending upon the polymerisation process used. The copolymers of the dispersions preferably have molecular weights of from 50,000 to 150,000.

The aqueous dispersions have solids contents of from 10 to 55 % by weight, preferably from 35 to 50 % by weight.

The polymers produced by the process according to the invention contain reactive groups which, even under extremely mild conditions, react with one another to form crosslinked polymers at any pH-values. With equivalent use of the α,β-unsaturated carbamic acid allyl esters, the crosslinking density is much higher by comparison with conventional crosslinking components, with the result that the use of even very small quantities of crosslinking component is sufficient to produce high crosslinking densities. This means that the copolymers according to the invention show outstanding resistance to solvents, temperatures and abrasion and, by virtue of these properties, can be used in a variety of different technical fields. Fillers, dyes, pigments, thickeners, plasticisers, modifiers etc., can be worked into the copolymers depending upon the purpose for which they are to be used. The process for applying self-crosslinking coatings to acid-sensitive and temperature-sensitive substrates, for example, materials based on cellulose or its derivatives, gelatin, keratin and other proteins, acid-sensitive metals, mortar, cement, etc., is of particular significance.

Dispersions prepared in accordance with the invention are particularly suitable for impregnating, consolidating and coating non-woven fabrics, for coating metal substrates and as dressings for leather.

The parts and percentage contents quoted in the following examples relate to weight unless otherwise stated.

EXAMPLE 1

A. 3.5 parts of sodium lauryl sulphate were dissolved in 180 parts of water and the resulting solution was emulsified in a solution of 20 % by weight of a monomer mixture of 95 parts of ethylacrylate and 5 parts of the compound of formula:

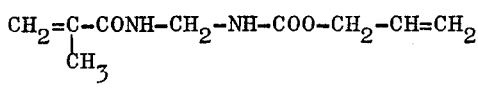

The resulting emulsion was heated while stirring to 35°C while pure nitrogen was passed through, followed by the addition of 0.1 part of sodium pyrosulphite and of 0.5 parts of potassium persulphate. Dropwise addition of the residual monomer mixture was commenced when a distinct reaction was recognisable from an increase in the internal temperature. Following addition of the monomers, the resulting dispersion was stirred at 40°C until the polymer component amounted to 35 % by weight. The copolymer contained incorporated units of about 95 % by weight of ethylacrylate and 5 % by weight of methacrylamidomethylene carbamic acid allyl ester. The molecular weight amounted to about 80,000, as measured by osmometry.

B. A monomer mixture of 95 parts of acrylic acid ethyl ester and 5 parts of the compound of formula:

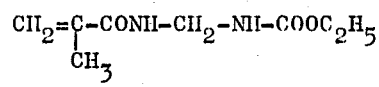

was polymerised under similar conditions. The copolymer was used for comparison in measuring the degree of swelling.

C. A monomer mixture of 95 parts of ethylacrylate and 5 parts of the compound of formula:

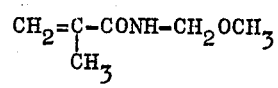

was polymerised under similar conditions. The copolymer was used for comparison in measuring the degree of swelling.

The polymer dispersions of tests A, B and C were drawn on to glass plates at pH 2 and pH 9 and the films formed after-treated under different conditions. The degree of swelling of the film was then determined by immersing them in dimethyl formamide for 24 hours and reweighing them. A relatively low degree of swelling indicates a high crosslinking density, whilst a high degree of swelling is indicative of a low crosslinking density.

The degree of swelling is defined as follows:

Q % = (swollen film/dry weight) ·100

% swelling in dimethyl formamide

| Test | dried at 20°C | treated for 15 minutes at 50°C | treated for 15 minutes at 100°C | pH-value |
|---|---|---|---|---|
| A (invention) | 90 | 75 | 75 | 2 |
|  | 315 | 280 | 245 | 9 |
| B (comparison) | 265 | 240 | 200 | 2 |
|  | 610 | 470 | 440 | 9 |
| C (comparison) | 850 | 800 | 410 | 2 |
|  | dissolved | dissolved | heavily swollen | 9 |

EXAMPLE 2

5.0 parts of a reaction product of 1 mol of oleyl alcohol and approximately 20 mols of ethylene oxide are dissolved in 125 parts of water, 65 parts of butylacrylate, 20 parts of styrene, 12 parts of butadiene and 3 parts of the compound

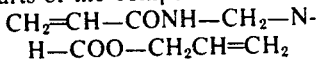

added and the resulting mixture emulsified with stirring at 35°C while pure nitrogen is passed through. Following the addition of 0.4 parts of potassium persulphate and of 0.1 parts of sodium pyrosulphite, the emulsion is polymerised until a 45 % dispersion is obtained. The copolymer contains the monomers incorporated in substantially the same ratio in which they were originally used. When the copolymer dispersion is drawn onto a glass plate and dried at 50°C, a completely insoluble film which shows 70 % swelling after 24 hours' storage in dimethyl formamide is obtained, irrespective of whether a neutral, acid or alkaline pH-value prevailed beforehand.

EXAMPLE 3

55 parts of butadiene, 38 parts of acrylonitrile, 5 parts of methacrylic acid and 2 parts of the compound

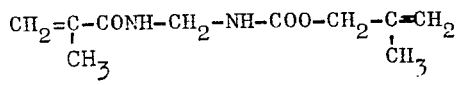

are emulsified in 133 parts of a solution of sodium paraffin sulphonate in 128.5 parts of water and the resulting emulsion polymerised with stirring at 20°C following the addition of 0.8 part of tert.-dodecylmercaptan and of 0.5 parts of sodium paraffin sulphinate. A yield of 80 % is obtained after 17 hours. The reaction is stopped, 2% of phenyl-β-naphthylamine added and most of the residual monomers removed by vacuum/steam distillation. The copolymer is precipitated with methanol, washed with water and squeezed off. It consists of copolymerised units of about 57 % butadiene, 36 % of acrylonitrile, 5 % of methacrylic acid and 2 % of methacrylamidomethylene carbamic acid methallyl ester. Molecular weight: approximately 65,000.

When the dried polymer is moulded, an elastic moulding is directly obtained.

EXAMPLE 4

The following combination of monomers is polymerised in the same way as described in Example 1:
60 parts of ethylacrylate
20 parts of butylacrylate
10 parts of acrylonitrile
8 parts of acrylic acid and
2 parts of methacrylamidomethylene carbamic acid allyl ester.

The copolymer contains the monomers in the ratio in which they were originally used. Following application of the dispersion to leather and drying for about 12 hours at ~20°C at a pH-value of about 8, even, smooth-surface coatings are obtained which are distinguished by their extremely high resistance to abrasion, water, solvents and to creasing.

I claim:

1. In process for producing highly reactive, self-crosslinkable copolymers of acrylamidomethylene carbamic acid esters or methacrylamidomethylene carbamic acid esters as monomer producing crosslinking sites and at least one other copolymerizable monomer by emulsion polymerization at temperatures of below about 60°C. in the presence of a radical forming catalyst, the improvement wherein acrylamidomethylene carbamic acid allyl ester, methacrylamidomethylene carbamic acid allyl ester, acrylamidomethylene carbamic acid methallyl ester or methacrylamidomethylene carbamic acid methallyl ester is used as the monomer to produce crosslinking sites.

2. An aqueous dispersion having a solid content of from 10 to 55% by weight of copolymerized units of 0.5 to 30% by weight of a monomer of the formula

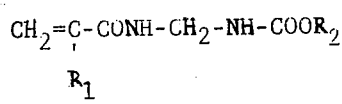

wherein $R_1$ is hydrogen or methyl and $R_2$ is allyl or methallyl and 95.5 to 70% by weight of at least one monomer selected from the group consisting of α,β-monoolefins having 2 to 4 carbon atoms, conjugated diolefins having 4 to 6 carbon atoms, methacrylic acid, acrylic acid, methacrylonitrile, acrylonitrile, methacrylamide, acrylamide, acrylic acid esters and methacrylic acid esters having 1 to 18 carbon atoms in the alcohol component, vinyl esters of organic monocarboxylic acids having from 1 to 18 carbon atoms, monoolefinically unsaturated halogenated hydrocarbons, aromatic vinyl compounds, α,β-monoolefinically unsaturated dicarboxylic acids having 3 to 5 carbon atoms, heterocyclic vinyl compounds, hydroxyalkyl esters, hydroxyalkyl amides, and aminoalkyl esters or amides of acrylic and methacrylic acid having 2 to 4 carbon atoms in the alkyl moiety.

3. A 10 to 55 % by weight aqueous dispersion of a copolymer of
  1 to 5 % by weight of methacrylamidomethylene carbamic acid allyl ester,
  70 to 85 % by weight of acrylic acid ester having 1 to 4 carbon atoms in the alcohol component,
  8 to 15 % by weight of acrylonitrile,
  5 to 10 % by weight of acrylic acid.

4. A leather-dressing agent containing 10 to 55 % by weight aqueous dispersions of a copolymer of
  1 to 5 % by weight of methacrylamidomethylene carbamic acid allyl ester,
  70 to 85 % by weight of acrylic acid ester having 1 to 4 carbon atoms in the alcohol component,
  8 to 15 % by weight of acrylonitrile,
  5 to 10 % by weight of acrylic acid.

* * * * *